(12) United States Patent
Heuberger et al.

(10) Patent No.: US 7,342,201 B1
(45) Date of Patent: Mar. 11, 2008

(54) SILCON CARBIDE ELEMENT

(75) Inventors: Martin Heuberger, Saarbrücken (DE); Michael Kuntz, Homburg (DE); Rüdiger Nass, Riegelsberg (DE)

(73) Assignee: Nanogate AG, Saarbrucken (DE)

( * ) Notice: Subject to any disclaimer, the term of this patent is extended or adjusted under 35 U.S.C. 154(b) by 0 days.

(21) Appl. No.: 10/148,038

(22) PCT Filed: Nov. 25, 2000

(86) PCT No.: PCT/DE00/04205

§ 371 (c)(1),
(2), (4) Date: Sep. 16, 2002

(87) PCT Pub. No.: WO01/38254

PCT Pub. Date: May 31, 2001

(30) Foreign Application Priority Data
Nov. 25, 1999 (DE) ................. 199 56 767

(51) Int. Cl.
*F23Q 7/00* (2006.01)
*H05B 1/02* (2006.01)

(52) U.S. Cl. .............. 219/270; 219/505; 219/552; 219/553; 219/260; 29/611; 361/264

(58) Field of Classification Search ............. 219/270, 219/505, 260, 552–553; 29/611; 361/264–266; 252/516; 338/22 R; 501/88
See application file for complete search history.

(56) References Cited

U.S. PATENT DOCUMENTS

| 2,001,297 | A | * | 5/1935 | Boyles | ............ 338/330 |
|---|---|---|---|---|---|
| 2,095,253 | A | * | 10/1937 | Heyroth | ............ 219/260 |
| 3,875,476 | A | * | 4/1975 | Crandall et al. | ............ 361/264 |
| 3,875,477 | A | * | 4/1975 | Fredriksson et al. | ............ 361/264 |
| 4,120,827 | A | * | 10/1978 | Boos et al. | ............ 252/512 |
| 4,125,756 | A | * | 11/1978 | Hierholzer et al. | ............ 219/121.85 |
| 4,205,363 | A | * | 5/1980 | Boos et al. | ............ 361/264 |
| 4,241,292 | A | * | 12/1980 | Kreick et al. | ............ 219/541 |
| 4,328,529 | A | * | 5/1982 | Hierholzer et al. | ............ 361/266 |
| 4,443,361 | A | * | 4/1984 | Hierholzer et al. | ............ 252/516 |
| 4,668,452 | A | * | 5/1987 | Watanabe et al. | ............ 501/90 |
| 5,322,824 | A |   | 6/1994 | Chia |   |
| 5,705,261 | A | * | 1/1998 | Axelson | ............ 428/210 |
| 6,090,733 | A | * | 7/2000 | Otsuki et al. | ............ 501/90 |
| 6,278,087 | B1 | * | 8/2001 | Willkens et al. | ............ 219/270 |
| 6,328,913 | B1 | * | 12/2001 | Shaffer et al. | ............ 252/500 |
| 6,448,539 | B2 | * | 9/2002 | Ose et al. | ............ 219/463.1 |
| 6,616,890 | B2 | * | 9/2003 | McPhillips | ............ 264/642 |
| 2002/0100753 | A1 | * | 8/2002 | Johnsgard et al. | ............ 219/468.1 |

FOREIGN PATENT DOCUMENTS

| DE | 42 33 626 |   | 4/1994 |
|---|---|---|---|
| DE | 195 37 714 |   | 4/1997 |
| GB | 1497871 | * | 1/1978 |
| JP | 11-079840 |   | 3/1999 |

* cited by examiner

*Primary Examiner*—Tu Ba Hoang
*Assistant Examiner*—Stephen J. Ralis
(74) *Attorney, Agent, or Firm*—Baker & Daniels LLP

(57) ABSTRACT

A ceramic heating element arrangement in which a ceramic heating element made of SiC having electrical NTC (negative temperature coefficient) properties is provided for a circuit. At least one segment is provided in the circuit, whose resistance saturates at least quasi-asymptotically at the current flow required for a desired heat development.

20 Claims, 3 Drawing Sheets

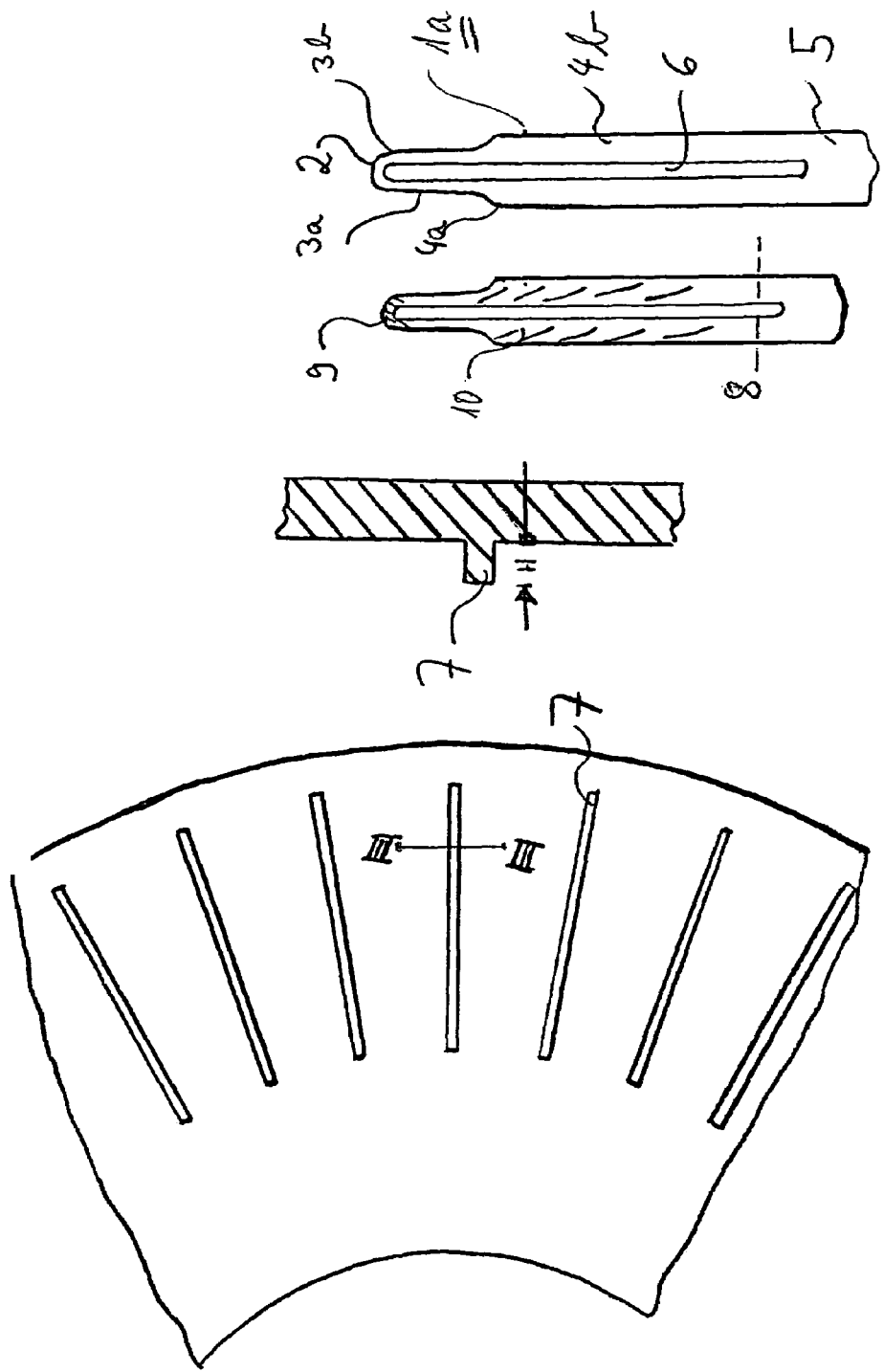

SILCON CARBIDE ELEMENT

FIELD OF THE INVENTION

The present invention relates to a ceramic heating element and to a method for its production.

BACKGROUND INFORMATION

Ceramic heating elements can be used, for instance, in the case of burners, for heating a mixture to be combusted to a temperature above the ignition temperature. Such ceramic heating elements made of silicon carbide may be produced in different ways. Frequently, the silicon carbide elements are not very dense but large-pored, which leads to a low mechanical loadability.

U.S. Pat. No. 5,322,824 describes a silicon carbide ceramic composite article that is sintered without the use of pressure, and has a direct current conductivity of at least 0.05 (ohm×cm)$^{-1}$, a volume density of at least 2.9 g/cm$^3$, a bending strength of at least 100 Mpa. The composite article has conductivity properties of the p type, and includes approximately 0.5 through 6.0 weight % of aluminum and 0.1 through 2.0 weight % of boron being admixed, the aluminum being provided in an equal or greater amount of weight as boron, and which further includes at least 0.1 through approximately 6.0% free carbons and at least 90 weight % silicon carbide, the silicon carbide being present predominantly in the alpha phase. According to U.S. Pat. No. 5,322,824, the silicon carbide element has a relatively low electrical resistance value because of doping by aluminum atoms and boron atoms in the silicon carbide crystal lattice structure, specifically by a diffusion mechanism at elevated temperatures, so as to form an SiC(Al, B) semiconductor of the p type. It is further explained that aluminum doping agents have a stronger resistance value-lowering effect on silicon carbide than boron doping agents. It is also mentioned that normal grain growth occurs sooner in SiC—Al—C systems than in SiB—B—C systems, namely at a sintering temperature higher than about 2,050° C., and that this grain growth is undesirable because of deterioration of mechanical properties. According to the above reference, the silicon carbide powder that is to be used as a starting material should itself have only low traces of contaminants such as graphite, aluminum, boron or free silicon. It is also suggested in the reference that the sintering of the initial blank may be carried out in a nitrogen atmosphere, as long as the resulting electrical conductivity is not of importance.

A sintered element made of silicon carbide or boron carbide is also described in German Patent No. 42 33 626, in which preparation of a sintered body made of silicon carbide or boron carbide includes: a) suspending silicon carbide or boron carbide in an aqueous or organic medium, and producing negative or positive surface charges by setting a suitable pH value; b) admixing a sintering additive which has a surface charge of opposite polarity from that of the silicon carbide or boron carbide; c) producing an initial blank from the slip obtained; and d) sintering the initial blank to a sintered element. The following two component sintering additives C/Al, C/B, C/Al$_2$O$_3$ or C/B4C are used in the case of SiC.

It is mentioned that a sintered element is obtained which may be used as a structural ceramic in the high temperature range, for example, for gas turbines, combustion chambers, rotor blades and turbine wheels; in chemical apparatus construction for use with strongly corrosive media; as heat exchangers, heat conductors, fireproof materials in high temperature furnace construction; in machine construction as gliding bearing and gliding ring seals; in the grinding materials industry; and in the electrical industry for the production of varistors and rectifiers. The SiC fibers, whiskers and composites then act to improve the firmness and the fracture toughness of oxidic and nonoxidic high-performance ceramics. According to DE 42 33 626, sintering is to be carried out without the application of pressure.

German Patent Application No. 195 37 714, referencing German Patent No. 42 33 626, describes how silicon carbide materials having good electrical properties, especially good electrical conductivity, good oxidation resistance and great firmness may be produced by pressure-less sintering. It is mentioned that, beside others, aluminum is a suitable element for adding via sintering additives. It is further stated that carbon may be effective as a reducing agent during sintering and may cleanse the grain surfaces of the SiC of SiC$_2$, which provides an increase in surface energy of the powder and the grain boundary diffusion during sintering. It is also stated that they are homogeneously distributed in the initial ceramic, so that these advantageous properties of the sintering additives can be utilized properly. It is also mentioned that, while it is true that good electrical conductivity may be achieved by doping agents such as aluminum nitride, molybdenum disilicide, phosphorus, arsenic and antimony, the sintering behavior of the ceramic is, however, influenced unfavorably by these additives, so that sufficient densification can be achieved only by pressure-supported sintering methods such as hot pressing or high-temperature isostatic pressing.

DE 195 37 714 provides that an afterglow step should be carried out in a nitrogen and/or carbon monoxide-containing atmosphere after sintering in a method for producing a conductive sintering element based on silicon carbide. This is purportedly leads to good electrical conductivity, which is especially useful for producing electric igniters. It is stated that the resistance of such an igniter may be adjusted via its geometry, and that the electric igniters described in DE 195 37 714 may be operated also at 220 V and may be dimensioned to be very small. A dumbbell-shaped electric igniter is particularly suggested, having an overall length of 60 mm and a width of 4 mm or 2 mm at a thickness of 1 mm. This should be heatable in air to a temperature of 1,300° C.

A disadvantage of the described arrangement is that the conventional SiC ceramics discussed in the reference have a negative temperature coefficient. For electrical igniters in gas or oil burners, it is usually required that a certain temperature sufficient for ignition be reached in a predefined time, and held there for a certain length of time sufficient for igniting a fuel mixture such as an air/gas and/or air/oil mixture flowing at 10 m/s past the hot electrical igniter. After the ignition, the igniter may be shut off. Because of the rapidly decreasing resistance of the conventional SiC ceramic heating elements having NTC(Negative temperature coefficient) properties, the igniter element and its mounting fixture heat up to undesirably high temperatures far above the ignition temperature. This may impair the electrical contacting and/or lead to sparkover. Attempts at integrating the NTC properties into the ceramic by fitting in a conductor having PTC properties can make hot pressing a necessary procedure, which impairs shaping.

SUMMARY

One object of the present invention is to provide a ceramic heating element arrangement having a ceramic heating element made of silicon carbide, which has electrical NTC properties, the ceramic heating element arrangement being designed in such a way that, at least temporarily, overheating of the actual ceramic heating element and the connecting part is highly unlikely.

According to a first embodiment of the present invention, a ceramic heating element arrangement is thus proposed, in which a ceramic heating element made of SiC and having electrical NTC properties is provided in an electric circuit. The electric circuit includes at least one segment having a temperature-dependent resistance which alters asymptotically into saturation at a value of current flow used to generate the ceramic heating element temperature.

According to the present invention, a segment-like subsection may be dimensional in such a way that the resistance does not fall off substantially, in spite of the NTC properties of the ceramic heating element made of silicon carbide, even at continually increasing current flow. This automatically leads to a limiting action.

For ignition elements such as oil furnaces, as well as for electric igniters for oil or gas burners and the like, it is normally sufficient if the segment resistance changes only a minimal amount with further increasing current. It was recognized that, especially with electric igniters that are operated for only a short time, and which are shut off after ignition, a quasi-stable characteristic behavior can be achieved even when the resistance changes slightly with increasing current.

Advantageously, the ceramic heating element arrangement may be used in an oil igniter which is heated on a single-story heating installation immediately above an oil storage tank or in a small quantity of oil, since the achievable glow temperatures are sufficient to avoid contamination and/or destruction of the surface by coking substances.

Because of its high resistance to corrosion, the SiC ceramic used in the ceramic heating element can also be used for heating corrosive media, such as for boiling highly concentrated mineral acids such as $H_2SO_4$. Solid substances may also be evaporated and/or melted, for instance, salt baths may be created. Sulfur, in particular, may be treated in this manner.

The ceramic electric ignition element may be particularly designed for temperatures at the hottest point in the range above 500° C., in particular 1,100° C. For oil and/or gas burner igniters, temperatures around 1,400-1,500° C. are used at this point. The limiting segment may be provided as part of the ceramic heating element, and especially at its warmest point. This can be achieved if the segment has a higher resistance per length than other regions of the ceramic heating element. For this purpose, either the segment may be narrower or thinner than other parts of the ceramic heating element and/or the specific resistance of the segment may be increased. Such a design of a ceramic heating element, in which different regions or segments have different electrical and/or thermal properties, can be advantageous in and of itself, independently of the electrical activation.

According to the present invention, an increase in the specific resistance may be achieved by changing the segment close to the surface or at the surface, in comparison with the rest of the ceramic heating element. This surface treatment can avoid possible problems with making changes to overall geometrical dimensions, because a reduction of the thickness of the ceramic heating element below certain limits can endanger mechanical stability in certain cases.

In particular, the conductivity of the surface materials may be raised by nitrogen doping. It was recognized that, during treatment of the sintered, fine-pored element in a nitrogen-CO atmosphere, the doping nitrogen, which raises the conductivity of the sintered element, remains primarily near the surface. That is, a nitrogen gradient develops which may be attributed to the great density of the ceramic parent substance. In nitrogen doping by introduction of the ceramic heating element into an $N_2$—CO atmosphere at elevated temperature, the segment resistance can be increased due to the better conducting nitrogen layer is removed or due to the fact that right from the beginning, doping with nitrogen is carried out in such a way that a reduced quantity of nitrogen is present at the segment. This can be achieved, for example, by sealing the segment with inert substances before diffusing nitrogen into the SiC element, for which inert substances impervious to gas may be used, or by doping via powders which selectively liberate nitrogen. The powders have a larger grain size (i.e. a smaller specific surface) do not need to be situated at the segment or not at all at the segment, but because they trap nitrogen, they may be arranged in the vicinity of the segment in large quantities. Such ceramic heating elements provide various embodiments of the ceramic heating element, in which different regions or segments have different electrical and/or thermal properties, which are advantageous per se, independently of the electrical activation. In an embodiment of the ceramic heating element, the tip of the ceramic heating element, for example, of a ceramic electric igniter, has a low specific conductivity because of high density and the low doping depth generated by the sintering method, whereas at the shank a lower density with a higher doping depth is set in order to achieve lower ohmic heating by a greater specific conductivity. This brings about an industrially applicable ceramic heating element having an optimal temperature profile and a thermally less-stressed mounting support.

In particular, the segment may have overall a lower cross section than other regions of the ceramic heating element. When a nitrogen layer is to be removed from the segment region, this can be done by filing away, sand blasting, ball peening, etc., a nitrogen-containing surface layer, which advantageously also simultaneously lowers the cross section of the ceramic heating element in the segment. Alternatively, one may perform re-sintering in the presence of a temperature gradient.

The ceramic heating element may be a silicon carbide element sintered without pressure. The development as an element sintered without pressure permits great freedom in the geometrical formation, which may be achieved by different methods. Thus, segments may be provided at any particular location and/or microstructures may be attained in the whole material or created at the surface. In particular, heat radiating ribs may be provided between the segment and the carrier.

While the segment may be designed as a part of the ceramic heating element, in an alternative specific embodiment of the present invention, the segment may be designed separately from the ceramic heating element by a series resistor having PTC properties. The series resistor may especially involve an incandescent bulb, such as an halogen lamp or the like, since in typical electric igniter applications such as for switching on burners, etc., the resistance change at increasing current flow takes place in the incandescent bulb about as rapidly as in the ceramic heating element. Thus, there is no danger that the ceramic igniter will overheat. A current and/or power limitation circuit can also be used for the ceramic heating element.

BRIEF DESCRIPTION OF THE DRAWINGS

FIG. 1 shows a silicon carbide blank according to the present invention.

FIG. 2 shows a completed SiC electric igniter element according to the present invention.

FIG. 3 shows a top view of a portion of a sintering mounting support for the blank of FIG. 1.

FIG. 4 shows a cross-sectional view of a portion of a sintering mounting support for the blank of FIG. 1.

DETAILED DESCRIPTION

Figure 6:
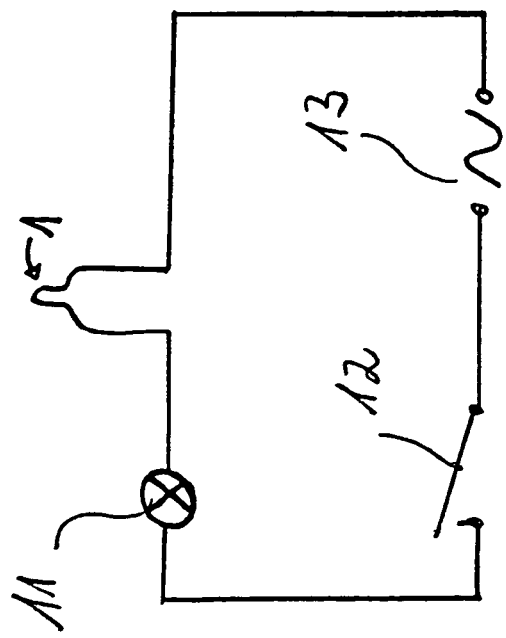
FIG. 6 shows an exemplary switching circuit arrangement for operating an electric igniter.

FIG. 1 shows an initial blank made of silicon carbide ceramic, which may be produced, for example, according to the method described in German Patent No. 42 33 626. In this context, however, deviating from the method described there, a silicon carbide starting material is used which has a low proportion of aluminum doping.

The slip produced from the aluminum-containing silicon carbide starting material is formed into an initial blank 1a. This initial blank 1a has a rounded tip 2 which is connected via two thin shanks 3a, 3b to a base element made of wider shanks 4a, 4b. The two shanks 4a, 4b are connected to each other in a region 5 at the opposite end of tip 2. A wide slot 6 extends between shanks 4a, 4b, 3a, 3b from tip 2 to lower connecting region 5.

In a practical exemplary embodiment, the initial blank has a thickness of about 1.5 mm and a length of about 65 mm.

The silicon carbide blank of FIG. 1 is mounted upon a round carrier made of graphite which has star-shaped running crosspieces 7 as shown in FIG. 4, which are narrower than slot 6. The initial blank is mounted on crosspieces 7 with its slot 6 in such a way that tip 2 is arranged at the radially outer end of crosspiece 7. All crosspieces 7 are so furnished. Crosspiece 7 has a height H (shown in FIG. 3) such that the crosspiece proceeds slightly beyond the superposed initial blank 1a so that now several of the star plates furnished with initial blanks may be stacked and sintered in a suitable sintering procedure.

Sintering is then carried out in an inert gas atmosphere of Ar/He. Because of the homogeneous distribution of the sintering additives, described in German Patent No. 42 33 626, silicon dioxide layers present at the SiC grain boundaries are reduced, and thus a uniform grain boundary structure having low transitional resistance to electrical and thermal flows is provided. This leads to a high heat conductivity on account of clean grain boundaries and superior resistance to temperature change. In addition, finely distributed pores result which, on average, are smaller than the average grain size and do not diminish stability, so that there are beneficial stability properties. Although the fine pore size has the effect that gases can penetrate during later heating, at least in small measure, in the case of nitrogen doping, a substantial part of the nitrogen may remain in the outer region.

The nitrogen doping can be performed in various ways. A first possibility is heating, or holding the sintered element in a heated state, in a nitrogen/carbon monoxide atmosphere. This atmosphere may contain, for instance, about 95% nitrogen and about 5% CO. The carbon monoxide may be used if the nitrogen doping is not carried out directly after the sintering, but the sintered initial blank is exposed to an oxygen-containing atmosphere by intermediate steps, such as during visual inspection. In this context, doping may especially be performed under pressure conditions deviating from standard pressure, e.g., in particular under increased pressure, in order to increase the doping speed.

The initial blank may be placed in entirety upon a nitrogen-releasing material such as silicon nitride, aluminum nitride, N-doped SiC, etc., or to lay it on only partially so as to achieve a gradient of nitrogen doping over the surface of the initial blank, and/or to embed it in one of these substances. In this approach, the areas coming into intensive contact with the nitrogen-releasing material are more highly doped.

It is also possible to embed alternatively determined areas in silicon carbide powder, which then competes with the silicon carbide of the sintered, or pre-sintered ceramic element for the nitrogen from the nitrogen atmosphere. Care should be taken that the silicon carbide powder is changed after each sintering process, so as to maintain a constant performance.

Additionally, the doping may be performed separately from the star-shaped plate.

In choosing the powder used for the doping or for the competition for nitrogen, the fineness of the powder plays a substantial role because of the various specific surfaces.

In the present example, the sintered ceramic element is nitrogen-doped for a sufficient period of time in an atmosphere of 95% nitrogen and 5% CO, so as to ensure that a surface or near-surface nitrogen doping takes place.

After the doping, tip 2 on both sides of the flat sintering element can be ground down, as shown by hatching 9, so that in the area of hatching 9 tip 2 no longer has the nitrogen doping close to the surface, which is indicated by hatching 10 for the remainder of the ceramic heating element member. Afterwards, lower region 5, which is useful for increasing stability during stability, may be cut off, as shown by line 8 in FIG. 2. The ceramic heating element may now be supplied with contacts. For this purpose, for instance, a usual conductor may be wrapped around with thin aluminum foil and this can then be soldered or welded on. Using the wrapping around of the wrapped conductor with highly ductile aluminum foil, an eruption of the ceramic at the place of contact, caused by different heat expansion of metal and ceramic, is avoided. Alternatively, for example, a nickel sheet can also be used, having a thickness such as around 0.05 mm. This can be soldered to the ceramic element using typical solder used for this purpose, such as Ti-containing activated solder "CB-4" of the firm Degussa, having almost a 50% proportion of silver and 50% of copper.

The contacted ceramic element may now be embedded in a potting compound by conventional methods. To avoid later sparkover between the two shanks 4a, 4b, a ceramic partition may be set into slot 6, which prevents sparkover of the potting compound when heating takes place.

The ceramic heating element which has been potted and is therefore ready for mounting may now be connected to an ac voltage source of about 230 V via the electrical winding contact leads proceeding from the potting compound which heats the entire ceramic element. On account of the heating, the resistance of the ceramic element, due to its NTC properties, is greatly decreased. This leads to a further increasing of current flow. In this context, a predominant part of the current will flow through the conductive nitrogen-doped surface layer, which is indicated in FIG. 2 by hatching 10. Since in the region of tip 2 this superficial layer has been removed, the resistance in this region is significantly higher, leading to a greater voltage drop in this region of tip 2 and, according to that, to an especially great temperature increase in the region of tip 2. In experimental trials, fatigue stemming from changing the resistance ratio of segment and the remaining ceramic heating element regions was not observed, even after repeated cycling.

Figure 5:
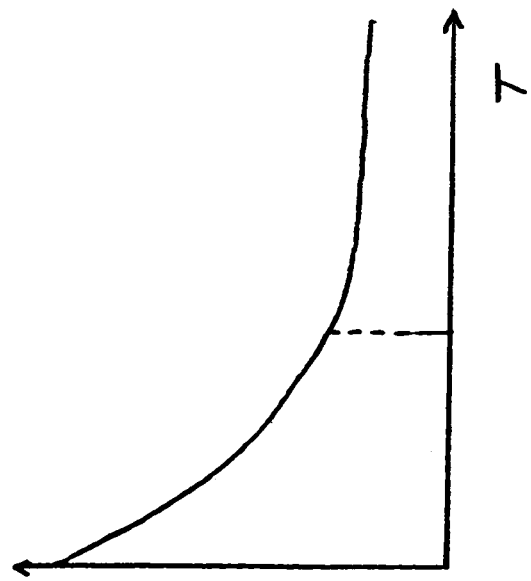
FIG. 5 is a schematic illustration of the dependence of the specific electrical resistance upon temperature of a silicon carbide segment according to the present invention.

FIG. 5 shows how the specific resistance of the silicon carbide decreases with temperature. It may be seen that, for high temperatures, an asymptotic saturation relationship develops. For very great heating of the tip, the asymptotic relationship is thus already present. This has the result that the overall resistance of the arrangement approaches the resistance value attributable to the geometric dimension of the tip and the specific resistance in the asymptotic region. That means that current flow through the tip cannot increase arbitrarily. Such an igniter may reach temperatures such as 1,200° C. and maintain these for at least 30 seconds without a higher temperature of, for example, 1,400° C. being exceeded. Because of this, by the design of a segment in the ceramic heating element, whose resistance goes into saturation quasi-asymptotically at a current flow required for the desired heat development, an at least quasi-stable behavior is achieved.

FIG. 6 shows of a ceramic heating element circuit in which a segment is provided having a resistance that saturates at least quasi-asymptotically at a current flow required for the desired heat development. In FIG. 6, 1 denotes a ceramic heating element made of silicon carbide according to either of German Patent No. 42 33 62 or German Patent Application No. 195 37 714, without a tip region being superficially ground off, as in the exemplary embodiment of FIG. 2. Furthermore, the circuit of FIG. 6 includes a commercially available incandescent bulb 11, for instance a 50 W halogen lamp, a switch 12 and a 230 V ac source 13.

When switch 12 is closed, at first a large current flows through the circuit because of the initial low resistance of incandescent bulb 11, and it heats ceramic element 1 with an NTC characteristic, whereupon the resistance falls off and the ceramic heating element heats up greatly. At the same time, and with an approximately comparable temperature increase, the temperature of the coiled filament present in the incandescent lamp also changes, whereupon its resistance increases, which limits the current. Incandescent lamp 11 thus acts as a PTC element, and the NTC properties of the ceramic heating element made of silicon carbide are at least partially compensated for. Incandescent lamp 11 thus represents the segment according to the present invention. With the arrangement shown, a high temperature such as 1,580° C. may be long-lastingly maintained without damage to the SiC element or its connections.

Figure 7:
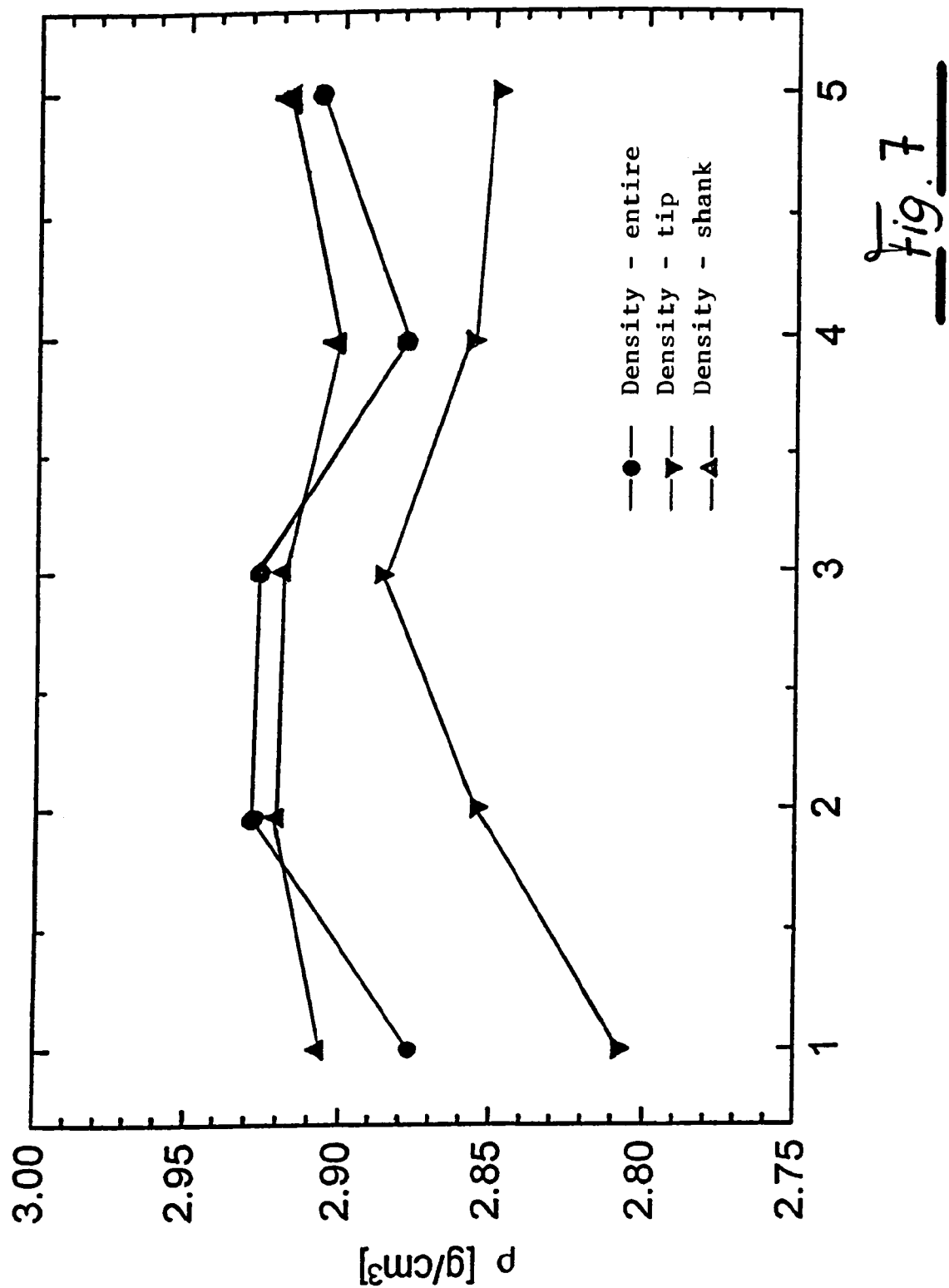
FIG. 7 illustrates experimental outcomes for densities over several trials performed according to the present invention.

FIG. 7 shows the density variation of the tip, shanks, and the entire element over different samples, in which the outer igniter tip was subsequently sintered so as to have temperature gradients, and thereafter doped. It may be clearly seen that the density at the shank is greater than that at the tip. This results in differences in heating behavior.

Thus, a ceramic heating element is provided which can even be operated over a timespan of from 15 to 45 seconds in quasi-stable fashion and without appreciable damage.

It is noted that the preliminary heating time of 30 seconds, customary for gas burners having the arrangements described, can be maintained, and that it is possible to change the igniter resistance during manufacturing of the heating element ceramic approximately up to a factor of 5, without having changes in the glow temperature become significant. In addition, by a suitable selection of the glow element/incandescent bulb combination the igniter control unit may be set to regionally different supply voltages or different glow temperatures, for example, on account of different gas flow speeds (lower incandescent bulb wattage values being used for higher supply voltages). The ceramic heating element may also be immersed into a liquid for heating, particularly in aggressive, compressed and/or supercritical fluids.

The simplified form design of the ceramic element by mere sintering permits developing shanks 4a, 4b so as to have heat-radiating ribs, so that the contact region, via which the shanks are connected to electrical supply lines, remains cooler because of the increased heat radiation.

It is noted that the 230 V supply voltage is merely exemplary and other supply voltages than 230 V ac may be used with an appropriate design.

The invention claimed is:

1. An electrical heating element, comprising:
   a ceramic body having electrical NTC properties the ceramic body comprising pressureless sintered SiC obtained from SiC particles, said body doped with nitrogen; and
   at least a portion of said body having an extent of nitrogen doping which is different from other portions of said body;
   wherein said portion is formed by a series resistor having PTC properties;
   wherein the series resistor is part of an incandescent bulb.

2. The electrical heating element of claim 1, wherein a resistance of said portion changes by 10 percent or less when the current flow increases by 20 percent.

3. The electrical heating element of claim 1, wherein a resistance of said portion changes by less than 5 percent when the current flow changes by 10 percent.

4. The electrical heating element of claim 1, wherein the electrical heating element is an ignition element.

5. The electrical heating element of claim 4, wherein the ignition element is one of an electric igniter and a gas igniter, for at least one of gas burners, solid fuel burners, and engines.

6. The electrical heating element of claim 5, wherein the electric igniter is an oil igniter for heating oil, and the gas igniter is configured for Diesel engines.

7. The electrical heating element of claim 5, wherein the ignition element reaches a temperature above 900° C. at a hottest point.

8. The electrical heating element of claim 7, wherein the ignition element reaches a temperature of at least 1,100° C. at a hottest point.

9. The electrical heating element of claim 1, wherein said portion is integrated into the heating element.

10. The electrical heating element of claim 9, wherein the heating element is configured so that, during current flow, a temperature of said portion rises higher than in said other portions of the heating element.

11. The electrical heating element of claim 10, wherein said portion has a higher specific resistance than said other portions of the heating element.

12. The electrical heating element of claim 11, wherein the specific resistance of said portion is increased by modifying a vicinity of a surface of said portion.

13. The electrical heating element of claim 9, wherein said portion has a smaller cross section than said other portions of the ceramic heating element.

14. The electrical heating element of claim 1, wherein the nitrogen content in said other portions is higher in a vicinity of a surface thereof than in an interior section thereof.

15. The electrical heating element of claim 1, wherein the nitrogen doping extent of said portion is reduced by at least one of:
   a) removal of a nitrogen-containing layer; and
   b) inclusion of a region having a reduced nitrogen content.

16. The electrical heating element of claim 1, wherein the electrical heating element has a substantially homogeneous SiC structure.

17. The electrical heating element of claim 1, wherein the electrical heating element is made of fine-pored SiC.

18. A method for producing a pressureless sintered SiC ceramic heating element, comprising:
   forming an initial SiC blank from SiC particles;
   doping the filtered blank by exposing the blank to a nitrogen atmosphere while pressureless sintering the blank; and
   varying the extent of nitrogen doping in at least a portion of the blank by at least one of:
      removing nitrogen from the portion after said doping step;
      placing only other portions of the blank on a nitrogen-releasing material during said doping step;
      embedding only other portions of the blank in a nitrogen-releasing material during said doping step;
      embedding only other portions of the blank in a powder which competes with the SiC for the nitrogen during said doping step; and
      pressureless sintering the portion to a first density while pressureless sintering other portions to a second density different from the first density prior to or during said doping step;
   wherein the portion is formed by a series resistor having PTC properties and the series resistor is part of an incandescent bulb.

19. An electrical circuit, comprising:
   a heating element including a silicon carbide ceramic body having electrical NTC properties, said body doped with nitrogen with at least a portion of said body having an extent of nitrogen doping which is different from other portions of said body; and
   a resistive element having electrical PTC properties, said resistive element comprising one of a portion of said heating element and a portion of the electrical circuit distinct from said heating element, wherein said resistive element comprises a series resistor and is part of an incandescent bulb.

20. The electrical circuit of claim 19, wherein said silicon carbide ceramic body comprises pressureless sintered SiC obtained from SiC particles.

* * * * *